United States Patent [19]
Uno et al.

[11] Patent Number: 5,673,767
[45] Date of Patent: Oct. 7, 1997

[54] MOTOR TRUCK

[75] Inventors: Toshihiko Uno; Yuji Aoyagi; Masamitsu Iwatani, all of Kariya; Tadashi Takenoshita, Kokubu, all of Japan

[73] Assignee: Toyota Auto Body Co., Ltd., Kariya, Japan

[21] Appl. No.: 563,260

[22] Filed: Nov. 28, 1995

[30] Foreign Application Priority Data

Nov. 28, 1994 [JP] Japan .................. 6-293235
Oct. 31, 1995 [JP] Japan .................. 7-283768

[51] Int. Cl.⁶ ............................................ B62D 33/06
[52] U.S. Cl. .................... 180/89.12; 280/781; 296/190
[58] Field of Search .................. 180/89.1, 89.11, 180/89.12, 89.13, 89.14, 89.16, 89.19, 68.6; 280/781, 783; 296/183, 184, 190, 194

[56] References Cited

U.S. PATENT DOCUMENTS

| | | | |
|---|---|---|---|
| 3,288,237 | 11/1966 | Muller | 180/89.13 |
| 4,819,980 | 4/1989 | Sakata et al. | 180/89.13 |
| 4,902,059 | 2/1990 | Tritton | 180/68.4 |
| 5,033,567 | 7/1991 | Washburn et al. | 180/89.12 |

FOREIGN PATENT DOCUMENTS

| | | | |
|---|---|---|---|
| 250184 | 2/1966 | Austria | 180/89.13 |
| 3-115581 | 11/1991 | Japan. | |
| 89/01435 | 2/1989 | WIPO | 180/89.13 |

Primary Examiner—Paul N. Dickson
Attorney, Agent, or Firm—Dennison, Meserole, Pollack & Scheiner

[57] ABSTRACT

A low profile cab-front-engine truck is converted by utilizing a normal chassis frame and a normal cab designed for a cab-over-engine truck in which an engine is arranged adjacent to a front axle and in which the cab is arranged over the engine. The cab is shifted to a front lower position in front of the engine. The low profile truck includes a frame extension provided on the forward end portion of the chassis frame, a front mount provided on the frame extension, and a rear mount provided on the frame extension or the chassis frame. The cab is supported at the front lower position by the front and rear mounts.

14 Claims, 13 Drawing Sheets

MOTOR TRUCK

BACKGROUND OF THE INVENTION

1. Field of the Invention

The present invention relates to a motor truck or a commercial vehicle such as a bottle car. Particularly, the present invention relates to a low profile cab-front-engine truck converted by utilizing a chassis frame and a cab designed for a cab-over-engine truck.

2. Description of the Prior Art

In general, conventional motor trucks are designed as a cab-over-engine truck in which an engine is mounted adjacent to a front axle and in which a cab is arranged over the engine. Such a cab-over-engine truck is advantageous in that the entire length thereof can be diminished and that it may provide excellent forward visibility for a driver.

Special purpose vehicles are used in airports. Such vehicles are designed generally as a low profile cab-front-engine vehicle in which a cab is arranged at a lower position in front of a front axle. Such a low profile cab-front-engine vehicle (hereinafter simply referred to as a low profile vehicle or truck) makes it easy to get on and off and therefore, is suitable for a vehicle to be frequently get on and off. Such a low profile vehicle is disclosed, for example, in Japanese Laid-Open Utility Model Publication No. 3-115581.

In a conventional manufacturing process, the cab-over-engine trucks and the low profile trucks as described above are designed and then fabricated individually. Therefore, the low profile trucks are customarily produced by utilizing a cab, a chassis frame, steering parts and other components each of which is specifically designed. However, in general, the low profile trucks are manufactured in small numbers for an intended specific use. Thus, when the low profile trucks are customer made on the basis of such a process, their manufacturing costs are very high compared to the cab-over-engine trucks which are mass produced for a large number of users.

If the low profile trucks can be produced by utilizing the main components as previously described which are designed for the cab-over-engine trucks, the manufacturing costs of the low profile trucks will be remarkably reduced.

Further, the low profile vehicle can be produced by remaking the cab-over-engine vehicle previously manufactured. Such a low profile vehicle as remade is disclosed, for example, in U.S. Pat. No. 5,033,567.

OBJECTS OF THE INVENTION

It is an object of the invention to readily optionally manufacture a low profile truck and a cab-over-engine truck.

It is another object of the invention to readily manufacture a low profile truck by entirely utilizing main components which are designed for a cab-over-engine truck and by adding some additional or modified components.

SUMMARY OF THE INVENTION

The present invention provides a low profile cab-front-engine truck converted by utilizing a normal chassis frame and a normal cab designed for a cab-over-engine truck in which an engine is arranged adjacent to a front axle and in which the cab is arranged over the engine, and by shifting the cab to a front lower position in front of the engine, comprising a frame extension provided on the forward end portion of the chassis frame, a front mount provided on the frame extension, and a rear mount provided on the frame extension or the chassis frame, the cab being supported at the front lower position by the front and rear mounts.

In the present invention, to avoid any interference developed between a ground surface and a front end of the low profile truck when the truck is moved from a flat ground to an inclined ground or vice versa, the frame extension includes a front lower surface which is inclined to correspond to an approach angle.

Further, to diminish reduction of the approach angle while maintaining a required strength, a front bumper to be provided on a forward end portion of the frame extension is made of a tubular member having a circular configuration in cross section. In such a case, to avoid the interference developed between the ground surface and the front end of the low profile truck when the truck is moved from the flat ground to the inclined ground or vice versa, the front bumper includes a side end section which is rearwardly extended along a side wall of the cab and which is downwardly inclined to correspond to the approach angle.

Further, to use a steering gear box for the cab-over-engine truck, the low profile truck includes a steering shaft linkage mechanism interconnecting between a steering shaft provided in the cab and the steering gear box mounted on the chassis frame. In such a case, the steering gear box is pivoted with respect to the chassis frame over a desired angle so that an input shaft thereof is forwardly directed.

Additionally, to obtain an additional luggage space, the low profile truck includes an auxiliary luggage box provided in a space which is formed over the front axle and the engine in accordance with the shift of the cab to the front lower position of the truck. The low profile truck also includes a utility box provided in a space which is formed under a floor panel of the cab in accordance with the shift of the cab to the front lower position of the truck.

According to the present invention as described above, the low profile truck can be manufactured by entirely utilizing the cab and the chassis frames designed for the cab-over-engine truck and by additionally utilizing the frame extension and the front and rear mounts. Thus, according to the present invention, the low profile truck can be manufactured by entirely utilizing the main construction elements designed for the cab-over-engine truck, thereby permitting ready and optional manufacture of low profile trucks and cab-over-engine trucks.

The present invention will become more fully apparent from the claims and the description as it proceeds in connection with the drawings.

DETAILED DESCRIPTION OF THE PREFERRED EMBODIMENTS

Preferred embodiments of the present invention will now be described in detail with reference to the drawings.

Each embodiment is directed to a low profile truck which is converted from a conventional motor truck or a cab-over-engine truck. Such a low profile truck is commonly known as a bottle car since it is mainly used for carrying bottled or canned soft drinks placed in cartons.

Figure 1:
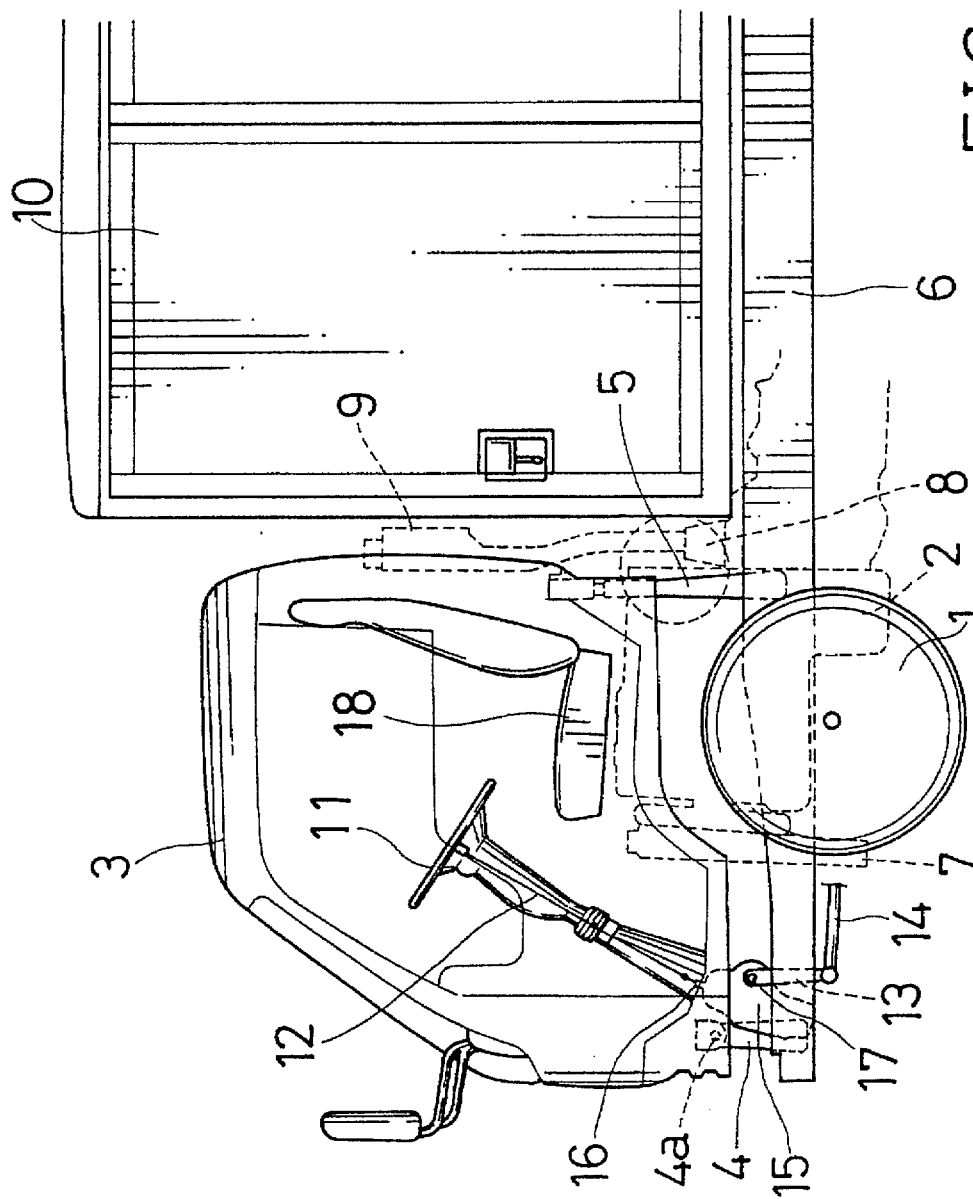
FIG. 1 is a side view of a conventional motor truck or cab-over-engine truck.
Figure 2:
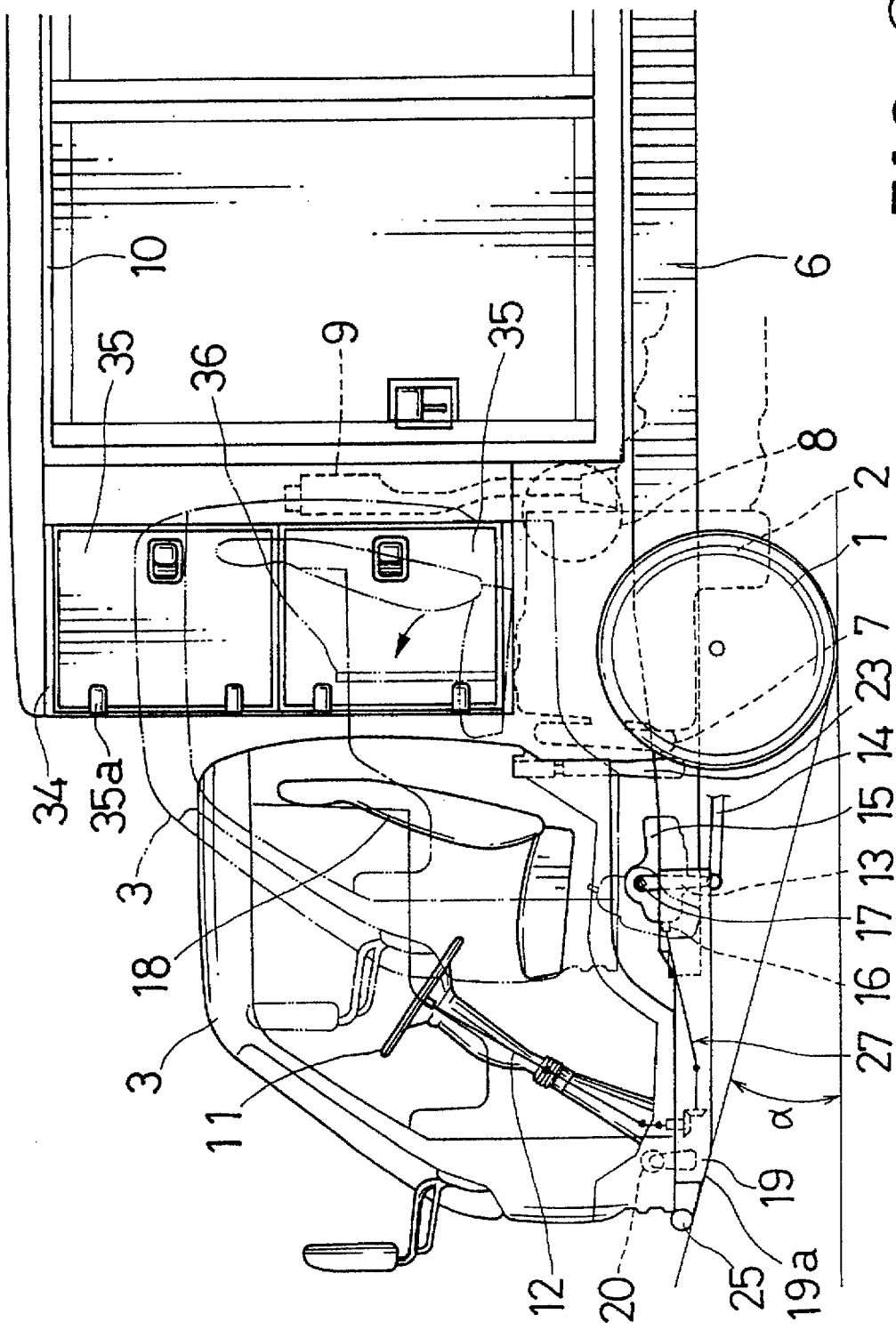
FIG. 2 is a side view of a low profile truck according to a first embodiment of the present invention.

Referring now to FIG. 1, shown therein is a cab-over-engine truck having a pair of laterally spaced channel-like normal chassis frames 6 (only one of which is shown), an engine 2, and a normal cab 3. The engine 2 is arranged near a front axle supporting front wheels 1 and mounted on the chassis frames 6. The cab 3 is arranged over the engine 2 and mounted on the chassis frames 6. As will be clearly shown, each chassis frame 6 has a front mount 4 and a rear mount 5 for mounting the cab 3 thereon. Each front mount 4 includes a pivot pin 4a for pivotal movement of the cab 3 between a closed or in-use position as shown and an open position (not shown) for maintenance of the engine 2. Further, in some cases, the pivot pin 4a can be omitted for fixedly mounting the cab 3 on the chassis frames 6. In such cases, the cab 3 is provided with an openable and closable engine covering plate (not shown) on a floor panel thereof for easy access to the engine 2. In FIG. 2, components indicated at 7, 8 and 9 are a radiator, an air cleaner and an air inlet duct, respectively. The air inlet duct 9 is vertically arranged adjacent to a luggage box (body) 10 behind the cab 3, and is preferably fixed to a wall of the luggage box 10 by means of an appropriate clamping member (not shown).

The cab-over-engine truck also has a steering gear box 15 mounted on a forward end portion of the chassis frames 6. The steering gear box 15 is one element constituting a steering system and is connected to a steering shaft 12 linked to a steering wheel 11 and to a steering linkage (which is constituted of a pitman arm 13 and a drag link 14) linked to the front axle. As will be appreciated, torque and angular displacement generated at the steering wheel 11 are transferred to the front wheels 1 supported by the front axle through the steering gear box 15. The steering gear box 15 has an input axis 16 connected to the steering shaft 12 and is arranged on the chassis frames 6 so that the input axis 16 is extended in a substantially vertical direction. Further, the steering gear box 15 has an output axis or a sector shaft 17 to which the pitman arm 13 is connected. A component indicated at 18 is a seat.

Referring now to FIGS. 2 and 3 to 9, shown therein is the low profile truck according to a first embodiment of the present invention converted from the cab-over-engine truck as described above. This embodiment will now be described with reference to FIGS. 2 and 3 to 9. Parts that are the same as those in FIG. 1 are given like reference numbers.

Figure 3:
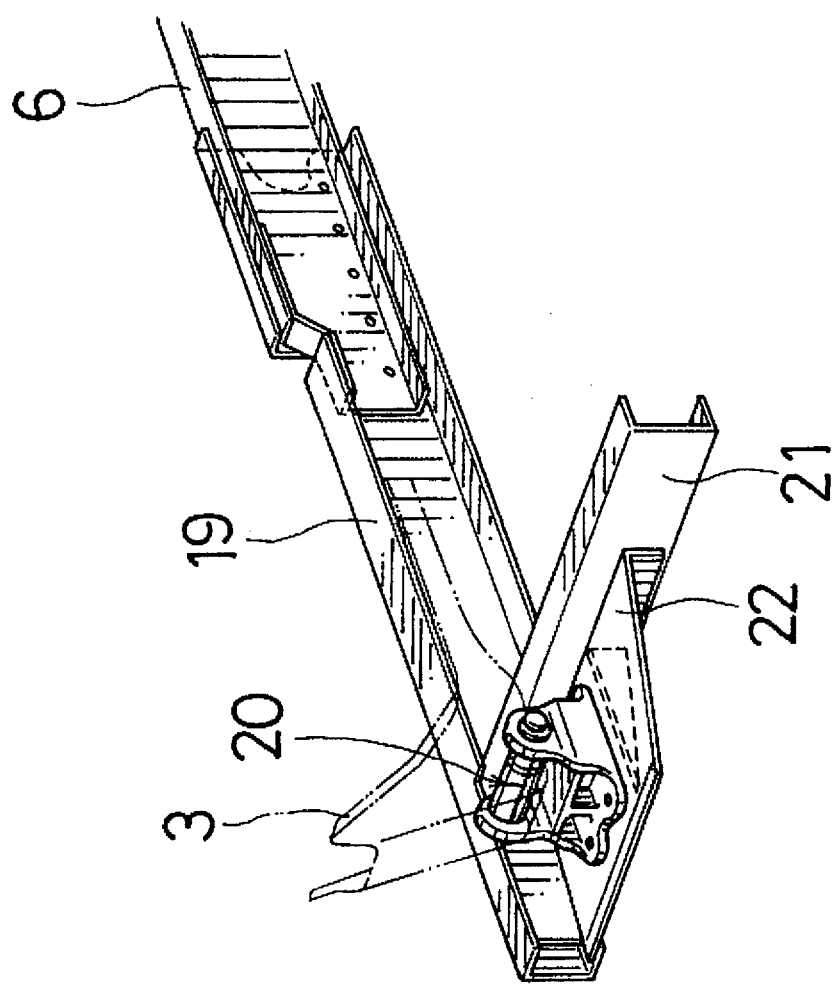
FIG. 3 is a perspective view of mounting structure of a frame extension and a front mount.
Figure 5:
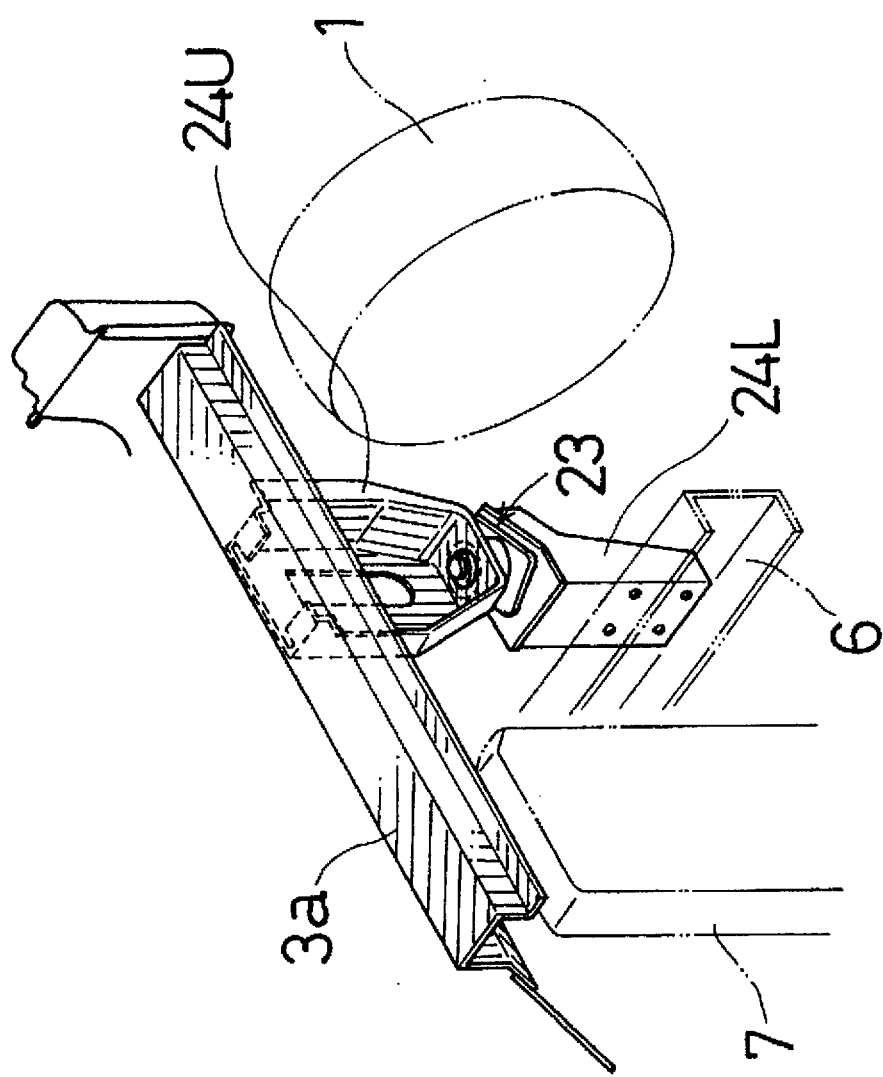
FIG. 5 is a perspective view of a rear mount showing mounting structure thereof.

In the low profile truck, the cab 3 is shifted from an upper position (shown in phantom lines) over the engine 2 to a front lower position (shown in solid lines) in front of the front axle supporting the front wheel 1 and the engine 2. To permit shift of the position of the cab 3, channel-like frame extensions 19 (only one of which is shown) are provided on the forward end portions of the laterally spaced chassis frames 6. Each frame extension 19 is substantially horizontally extended and is connected to the chassis frame 6 by welding or the like (see FIG. 3). As will be recognized, the cab 3 is mounted on the frame extensions 19 by front mounts 20 (only one of which is shown in FIG. 3) and rear mounts 23 (only one of which is shown in FIG. 5). Thus, the low profile truck is made by utilizing the cab 3 and the chassis frames 6 designed for the cab-over-engine truck. As will be appreciated, in the low profile truck thus constructed, it will be unnecessary to provide the front and rear mounts 4 and 5.

Figure 4:
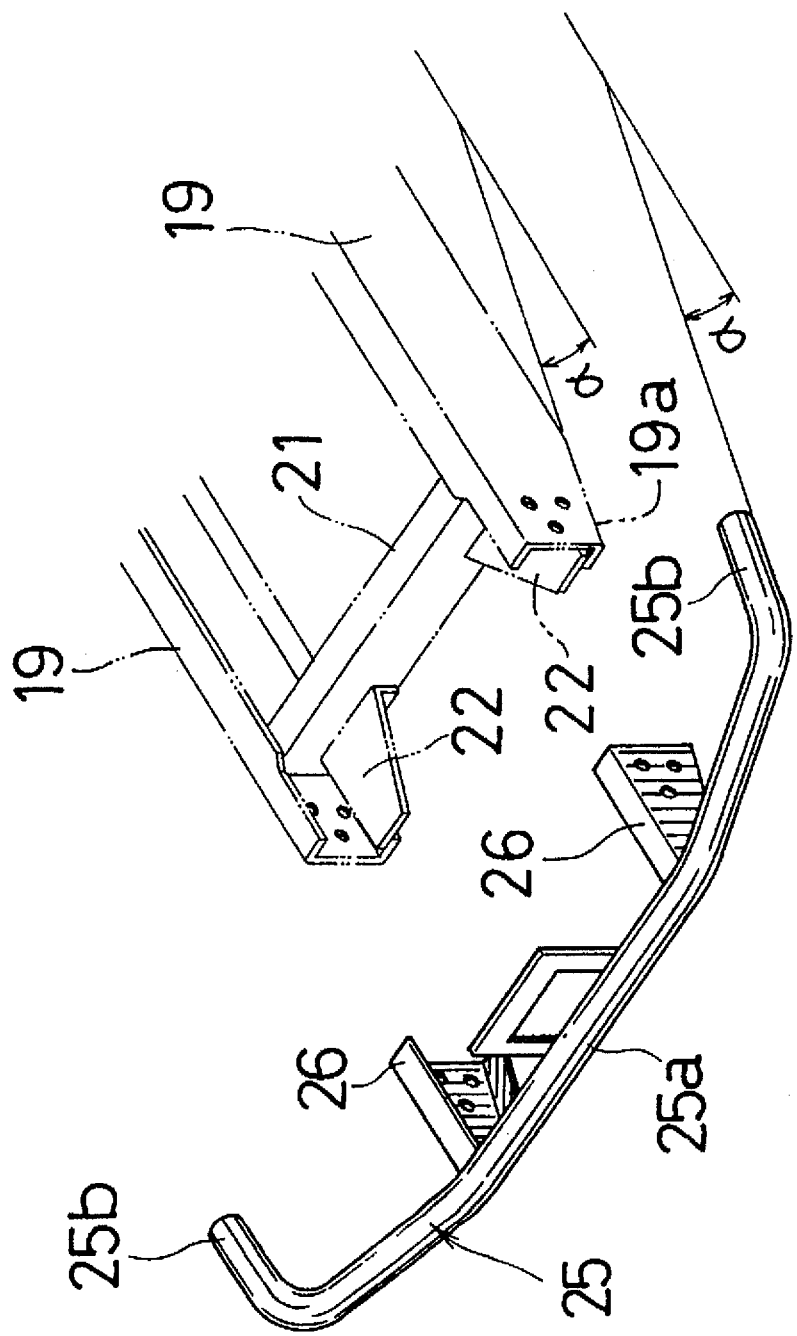
FIG. 4 is a perspective view of a front bumper showing mounting structure thereof.

As shown in FIGS. 3 and 4, the frame extensions 19 also include a cross member 21 which extends laterally from forward end portions of the frame extensions 19 and include plate-like brackets 22 which are arranged adjacent to intersections of the frame extensions 19 and the cross member 21. As shown in FIG. 3, the front mounts 20 are mounted on the bracket 22. Further, as shown in FIG. 5, each rear mount 23 is mounted on the chassis frame 6 by a bracket 24L. As clearly shown therein, each rear mount 23 is coupled to a mounting frame 3a of the cab 3 by a bracket 24U, thereby to fixedly mount the cab 3 on the frame extension 19. It is to be noted that each bracket 22 for the front mount 20 is arranged along a lower side or a lower flanged portion of the frame extension 19 so as to sufficiently lower the position of the cab 3.

As best shown in FIG. 4, a front bumper 25 is mounted on the forward end portions of the frame extensions 19 by a pair of brackets 26. The front bumper 25 is made of a tubular member having a circular configuration in cross section and has a forwardly projected central section 25a which may form a front end of the low profile truck.

As shown in FIGS. 2 and 4, each frame extension 19 has a front lower surface 19a which is upwardly inclined to correspond to an approach angle α. As is well known to those skilled in the art, the approach angle α is the angle of a tangential plane of the front wheel 1 passing through the lower surface of the central section 25a with respect to a ground surface. Moreover, the front bumper 25 includes side end sections 25b which are rearwardly extended along side walls of the cab 3. Each side end section 25b is downwardly inclined to correspond to the approach angle α.

Figure 6:
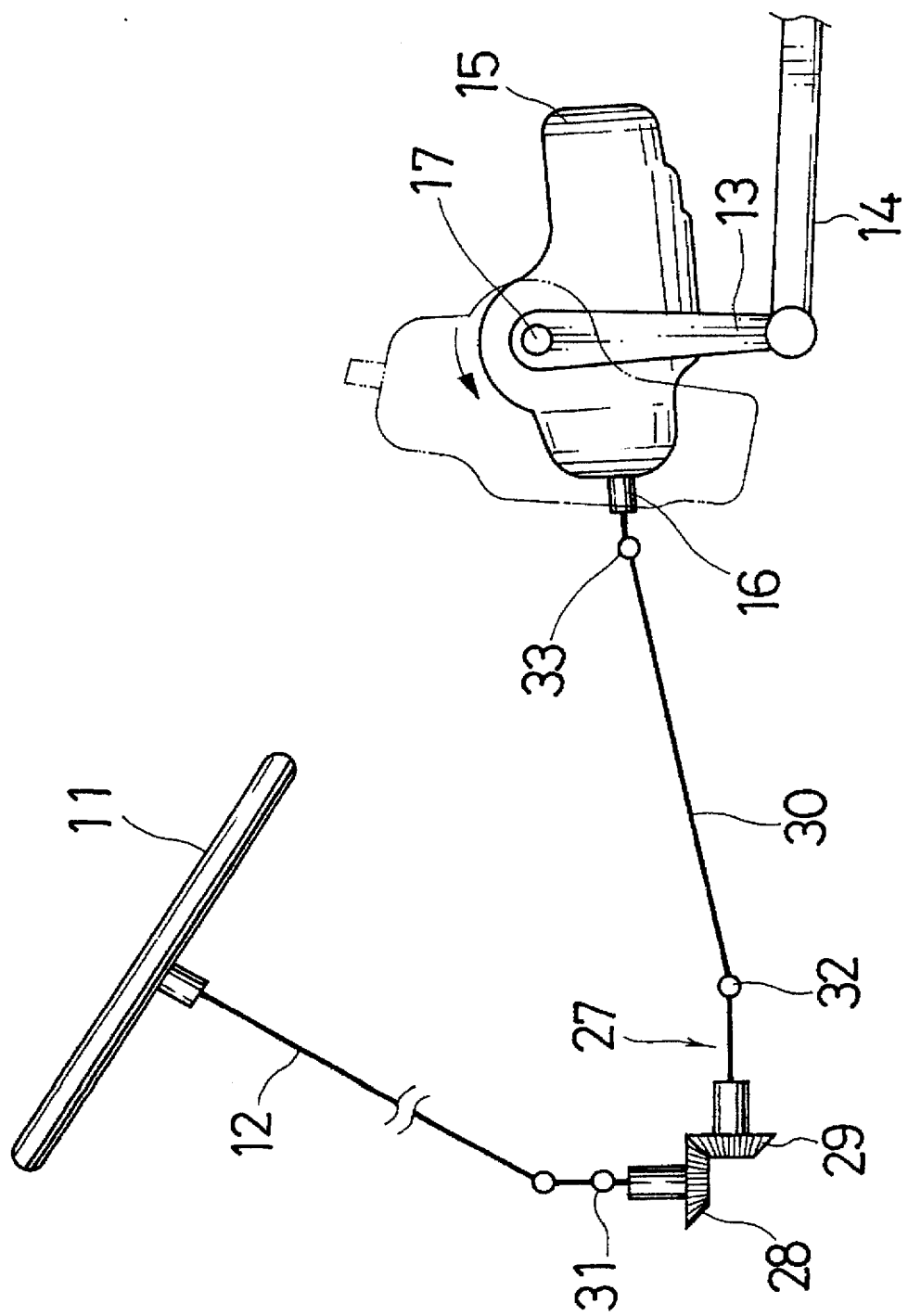
FIG. 6 is a schematic view of a steering shaft linkage mechanism.
Figure 7:
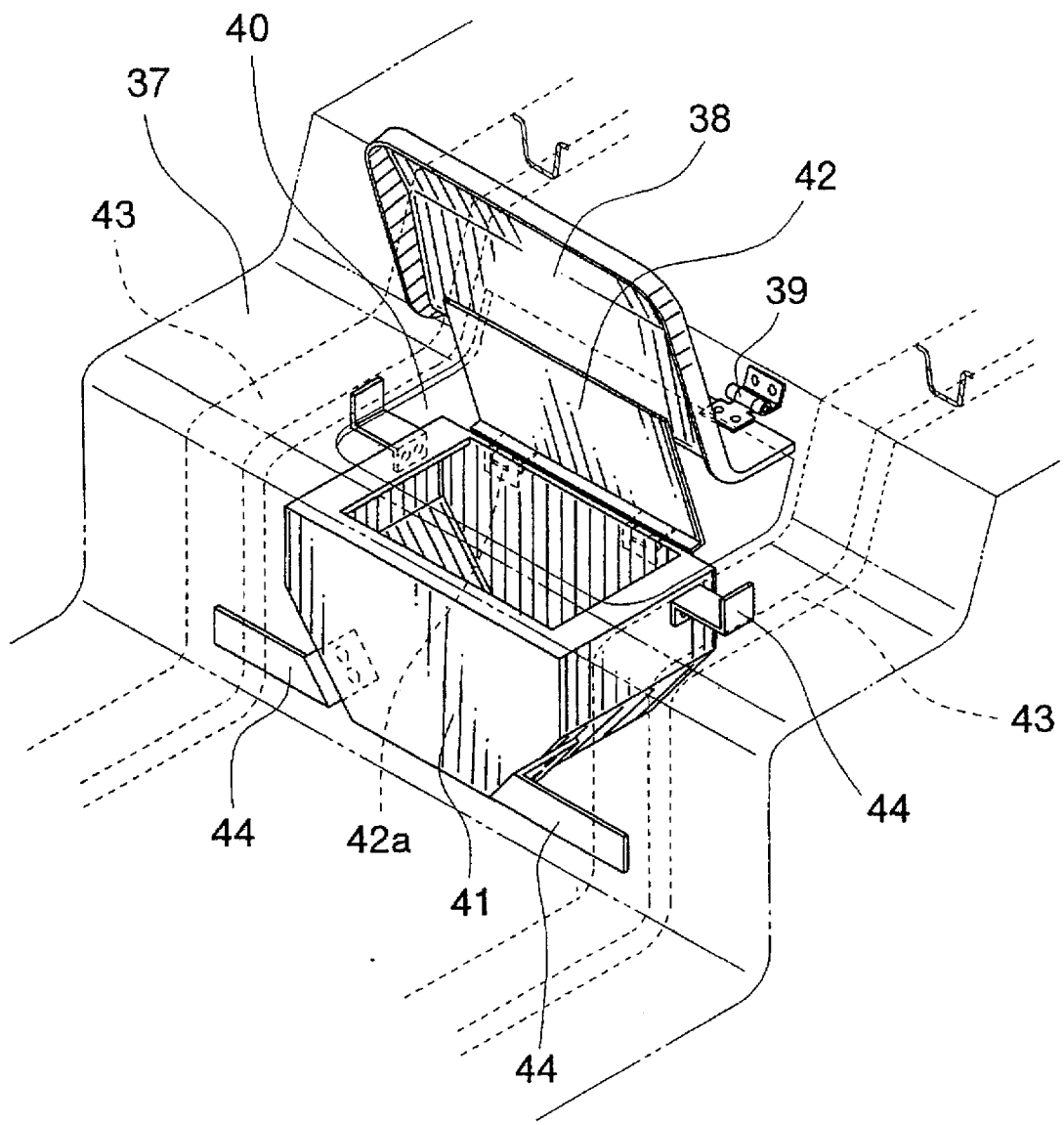
FIG. 7 is a perspective view of a utility box provided in a space under a floor panel of a cab.
Figure 8:
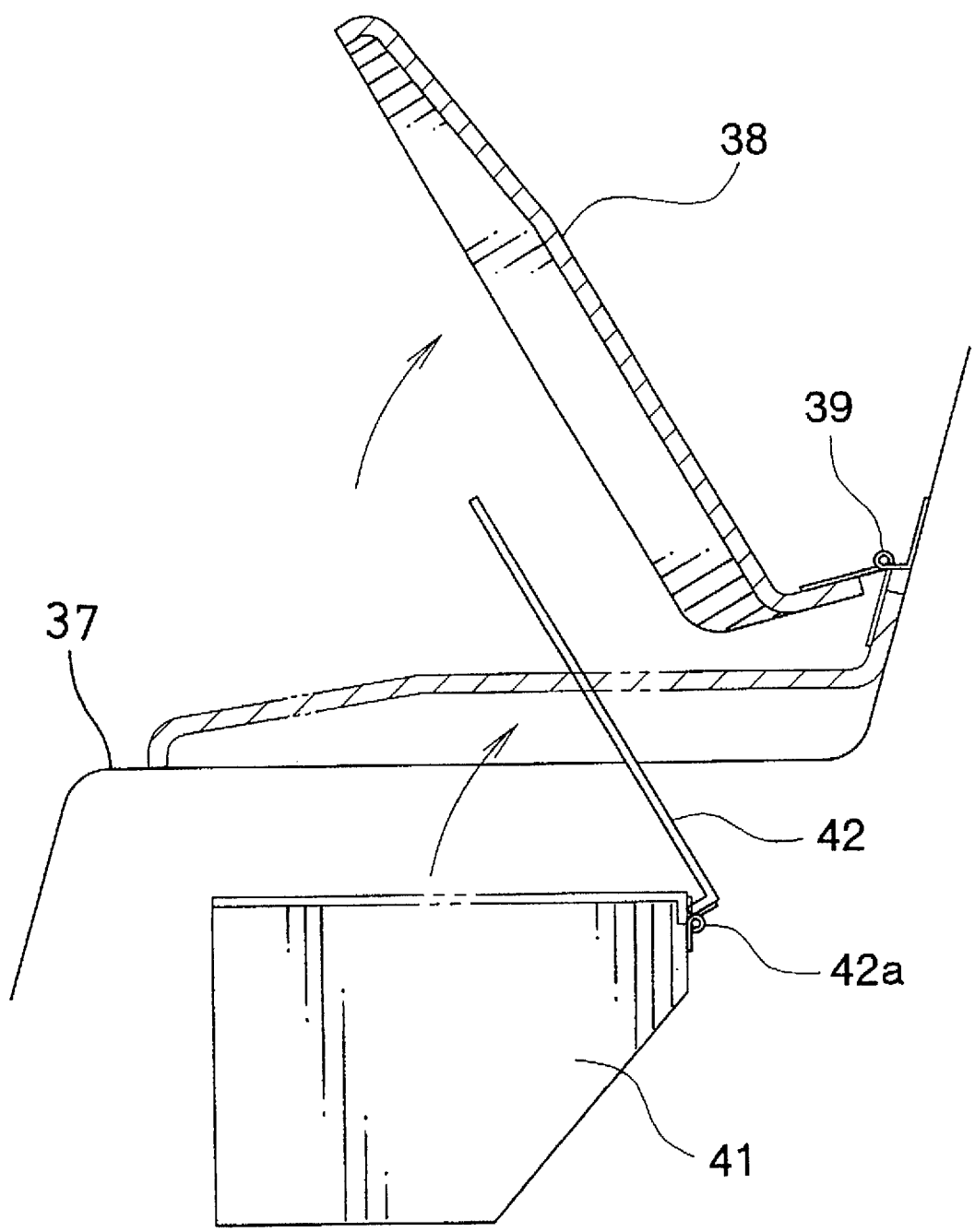
FIG. 8 is a side view partially in section of the utility box and a covering component.

To permit shift of the position of the cab 3, the steering system includes a steering shaft linkage mechanism 27 arranged between the cab 3 and the steering gear box 15 so that the torque and the angular displacement generated at the steering wheel 11 are transferred to the steering gear box 15 at the ratio of 1 to 1. As shown in FIG. 6, the steering shaft linkage mechanism 27 is constituted of a bevel gear 28 having an axis, a bevel gear 29 having an axis and meshed with the bevel gear 28, and a linkage shaft 30 having end portions. The axis of the bevel gear 28 is coupled to the steering shaft 12 by a universal joint 31. The end portions of the linkage shaft 30 are coupled to the axis of the bevel gear 29 and the input shaft 16 of the steering gear box 15 by universal joints 32 and 33, respectively.

As will be recognized, to simplify the steering shaft linkage mechanism 27, the steering gear box 15 is mounted to pivot around the sector shaft 17 at an angle of approximately 90° forward from a normal position or a position for the cab-over-engine truck in which the input shaft 16 is upwardly directed, as shown in phantom lines in FIGS. 2 and 6, so that the input shaft 16 is forwardly directed to form generally parallel relationship with the chassis frames 6.

Thus, in the low profile truck, the steering gear box 15 for the cab-over-engine truck is entirely utilized only by changing the angular relationship with the chassis frame 6 except that the steering shaft linkage mechanism 27 is additionally used. As will be easily understood, the arrangement of the pitman arm 13, the drag link 14 and other related elements is substantially the same as that of the cab-over-engine truck since the position of the sector shaft 17 is essentially unchanged. Moreover, the engine 2, the radiator 7, the air cleaner 8, and other related components for the cab-over-engine truck are used without modifying the conventional arrangement.

The low profile truck converted according to the invention has a considerable space over the front axle and the engine 2 since the cab 3 is shifted to the front lower position. To effectively use the space, an auxiliary luggage box 34 is provided in the space, as shown in FIG. 2. In this embodiment, the auxiliary luggage box 34 is completely separated from the luggage box 10 and is divided into upper and lower compartments each of which has an outwardly openable door 35 hinged thereto by hinges 35a. Further, the lower compartment of the auxiliary luggage box 34 includes an engine cover 36 provided on a bottom wall thereof for maintenance of the engine 2. As shown in phantom lines in FIG. 2, the engine cover 36 opens for easy access to the engine 2.

Due to forward transfer of the cab 3, the low profile truck thus converted also has an additional usable space under the floor panel of the cab 3. As will be easily understood, the space is an inherent one to such a low profile truck since such a space is necessarily occupied by a part of the engine 2 in the cab-over-engine truck. To effectively use the space, a utility box 41 is provided in the space and will be hereinafter described with reference to FIGS. 7 to 9.

Figure 9:
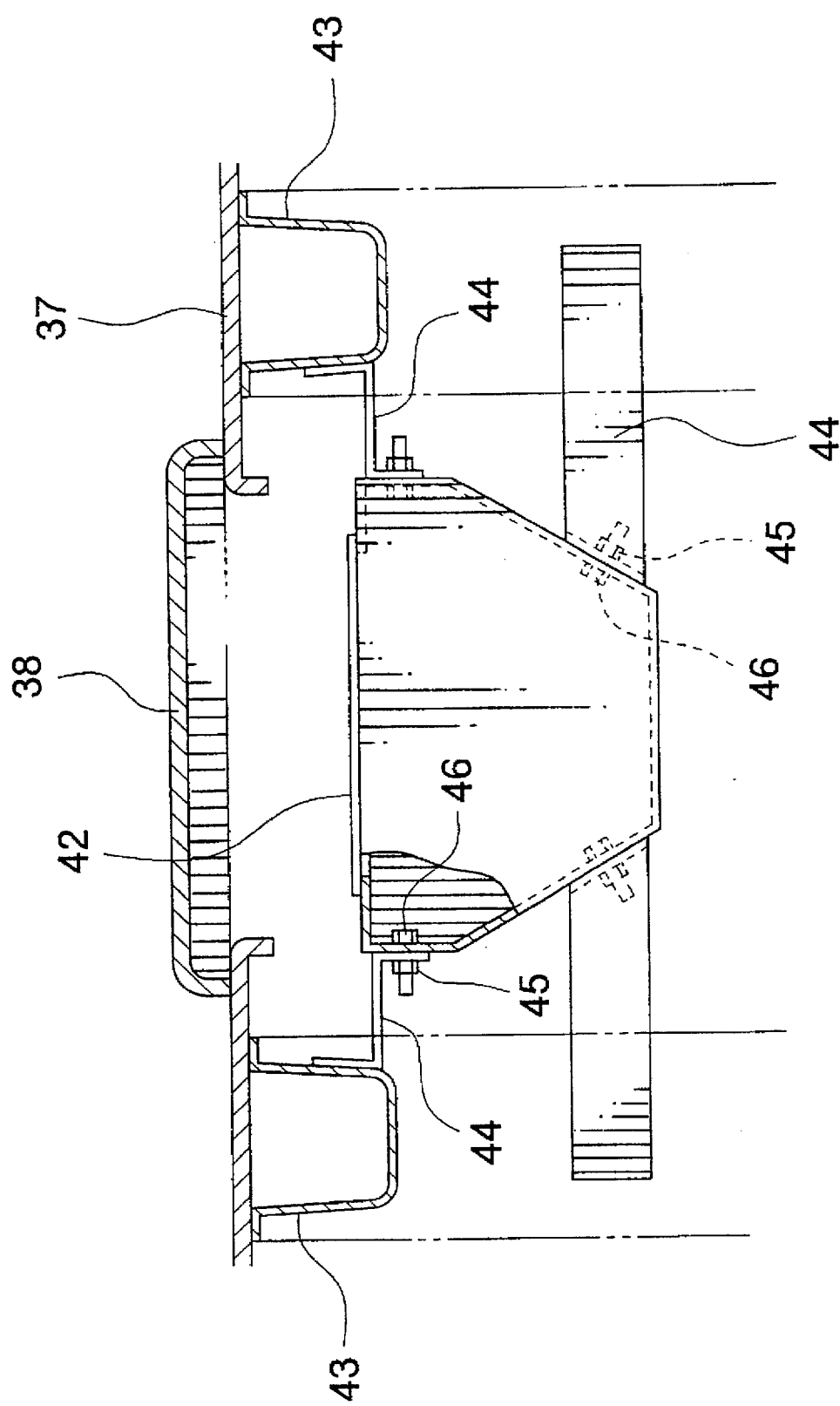
FIG. 9 is a transversely sectional view of the utility box and the floor panel.

As shown therein, the floor panel 37 of the cab 3 includes an opening 40 for service of the engine 2 and is provided with a covering component 38 for opening and closing of the opening 40. The covering component 38 is hinged to the floor panel 37 by hinges 39. The covering component 38 opens for easy access to the engine 2 when the cab 3 is used for the cab-over-engine truck. The covering component 38 is locked by a locking member (not shown) when it is in a closed position. The utility box 41 is arranged immediately under the opening 40 which is opened and closed by the cover 38. The floor panel 37 has a pair of laterally spaced reinforcement beams 43 provided on a lower surface thereof. Each reinforcement beam 43 has a U-shaped configuration in cross section and is provided with a plurality (shown as four in number for illustration purposes) of brackets 44 by welding for mounting the utility box 41 on the floor panel 37. As best shown in FIG. 9, each bracket 44 has a weld nut 45 to be threadably engaged with a bold 46. The weld nut 45 is engaged with the bolt 46 pierced outwardly through a side wall of the utility box 41, thereby securing the utility box 41 to the floor panel 37.

The utility box 46 includes a lid 42 openably and closably provided on an upper portion thereof by hinges 42a. The lid 42 is also locked by a locking member (not shown) when it is pivoted to a closed position.

As described hereinafter, in the present embodiment, the low profile truck can be manufactured entirely by utilizing the cab 3 and the chassis frames 6 for the cab-over-engine truck and by additionally utilizing the frame extensions 19 and the steering shaft linkage mechanism 27. Thus, the low profile truck can be manufactured entirely by utilizing the main construction elements designed for the conventional cab-over-engine truck. This may lead to the ready and optional manufacture of low profile trucks and cab-over-engine trucks.

Moreover, manufacturing cost of the low profile truck thus constructed substantially equals to that of the cab-over-engine truck except for an additional cost for the frame extension 19 and the steering shaft linkage mechanism 27. In other words, such a low profile truck can be manufactured by substantially by entirely utilizing manufacturing equipment for the cab-over-engine truck, thereby eliminating costs for providing special manufacturing equipment for the low profile truck. Therefore, the manufacturing cost of the low profile truck constructed according to the invention is reduced when compared to that of a custom made low profile truck manufactured by utilizing specifically designed components.

In the low profile truck in the present embodiment, the cab 3 is mounted on the frame extensions 19 by the front mounts 20 and the rear mounts 23 arranged as described above so as to be located as low as possible. This may lead to improved efficiency of getting on and off. However, such a construction may necessarily reduce the approach angle $\alpha$ of the low profile truck. In the present embodiment, to diminish reduction of the approach angle $\alpha$ caused by lowering of the cab 3, the front bumper 25 which forms the front end of the low profile truck is positioned at a level which is higher than the lower surfaces of the frame extensions 19, and the front lower surface 19a of each frame extension 19 is upwardly inclined to be coplanar with the tangential plane of the front wheel 1 passing through the lower surface of the front bumper 25. The approach angle $\alpha$ thus obtained may effectively avoid any interference developed between the ground surface and the front end of the low profile truck when the truck is moved from a flat ground to an inclined ground or vice versa.

Moreover, in the present embodiment, the front bumper 25 is made of a tubular member having a circular configuration in cross section so as to effectively diminish the height thereof while maintaining a strength equal to that of a bumper made of a channel-like member, thereby effectively increasing the approach angle $\alpha$.

In the present embodiment, the auxiliary luggage box 34 which is independent of the luggage box 10 is provided in the space which is formed over the front axle and the engine 2 in accordance with the forward placement of the cab 3. The auxiliary luggage box 34 may be used as a container for collecting empty bottles and empty cans. Also, the auxiliary luggage box 34 includes the engine cover 36 to facilitate maintenance of the engine 2.

Furthermore, in the auxiliary luggage box 34, a pull-out drawer (not shown) can be used in place of the door 35. In such a case, the bottom wall of the lower compartment of the auxiliary luggage box 34 is preferably removed so that access to the engine 2 for maintenance can be readily attained when the drawer is pulled out from the lower compartment.

In the present embodiment, the utility box 41 is provided in the space which is formed under the floor panel 37 of the cab 3 in accordance with the forward placement of the cab 3, thereby permitting full use of the space inherent to the low profile truck.

Figure 10:
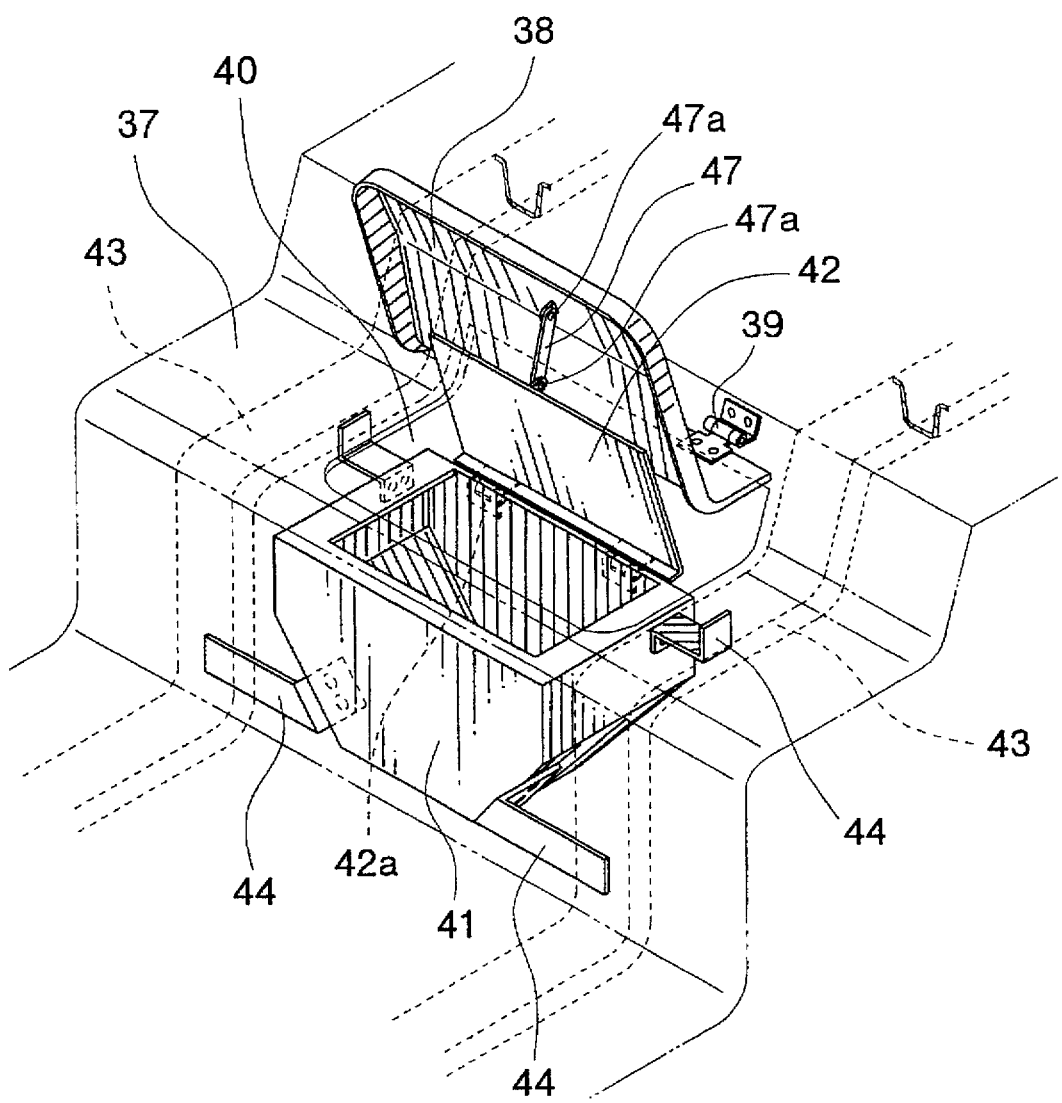
FIG. 10 is a perspective view of a modified utility box in a second embodiment of the present invention.
Figure 11:
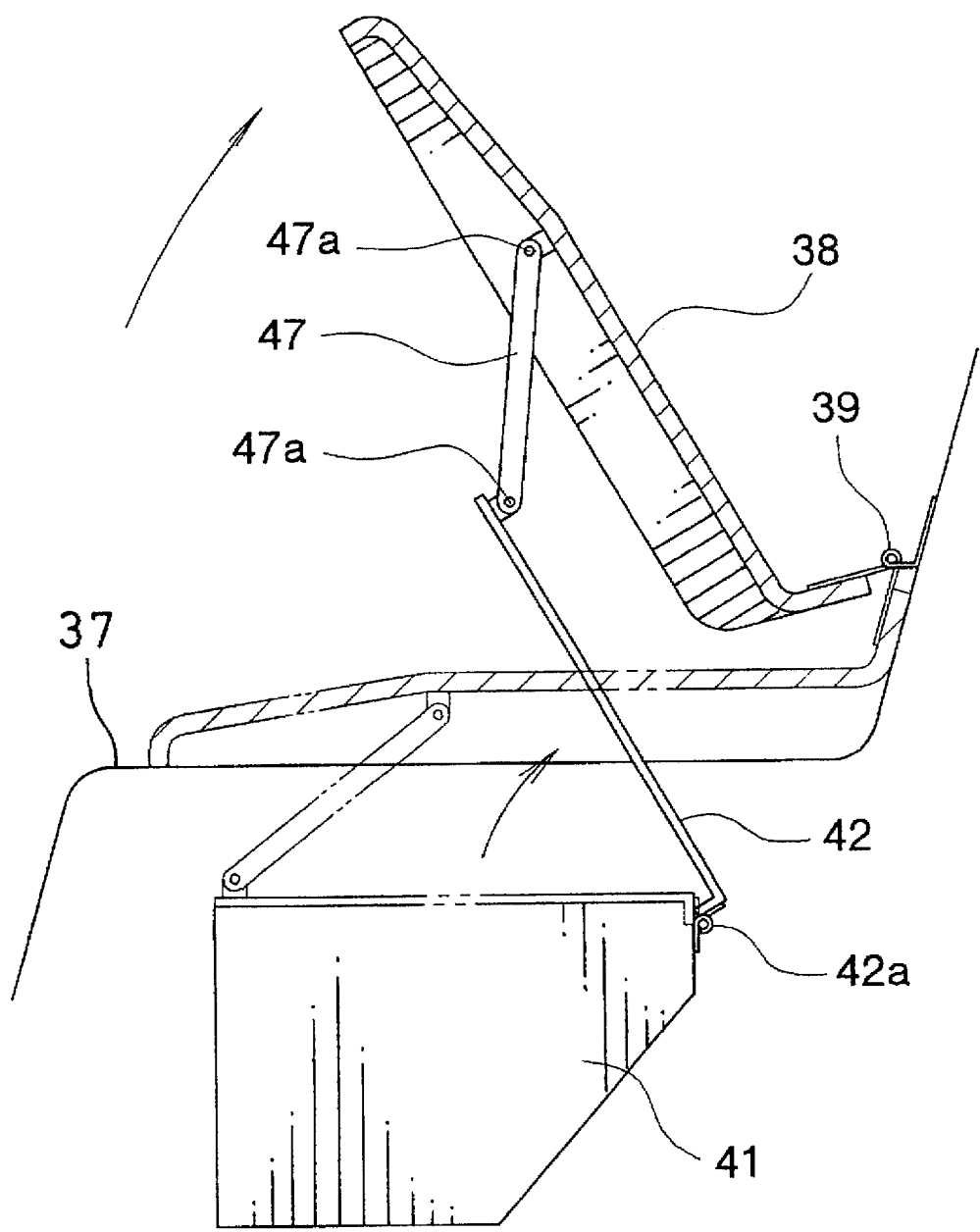
FIG. 11 is a view similar to that of FIG. 8 and illustrates the utility box and a covering component according to the second embodiment.

Referring to FIGS. 10 and 11, shown therein is the low profile truck (only a part of which is shown) according to a second embodiment of the present invention which is a modification of the first embodiment. This embodiment will now be described with reference to FIGS. 10 and 11, wherein only parts different from those in FIGS. 2 and 3 to 9 will be explained.

In this embodiment, a connecting bar 47 as connecting means is provided between the lid 42 of the utility box 41 and the covering component 38. The connecting bar 47 is pivotally connected at both ends to an upper surface of the lid 42 and a lower surface of the covering component 38 by pivot pins 47a, so that the lid 42 can be moved with the covering component 38. Therefore, the lid 42 can be correspondingly opened and closed when the covering component 38 is opened and closed. This may lead to easy and speedy access to the utility box 41. The connecting bar 47 may be made of rigid and strong material so that the lid 42 is forced down when the covering component 38 is closed, thereby eliminating the locking member for the lid 42. This may contribute to simplify the construction of the utility box 41 and to reduce the manufacturing cost of the low profile truck.

Figure 12:
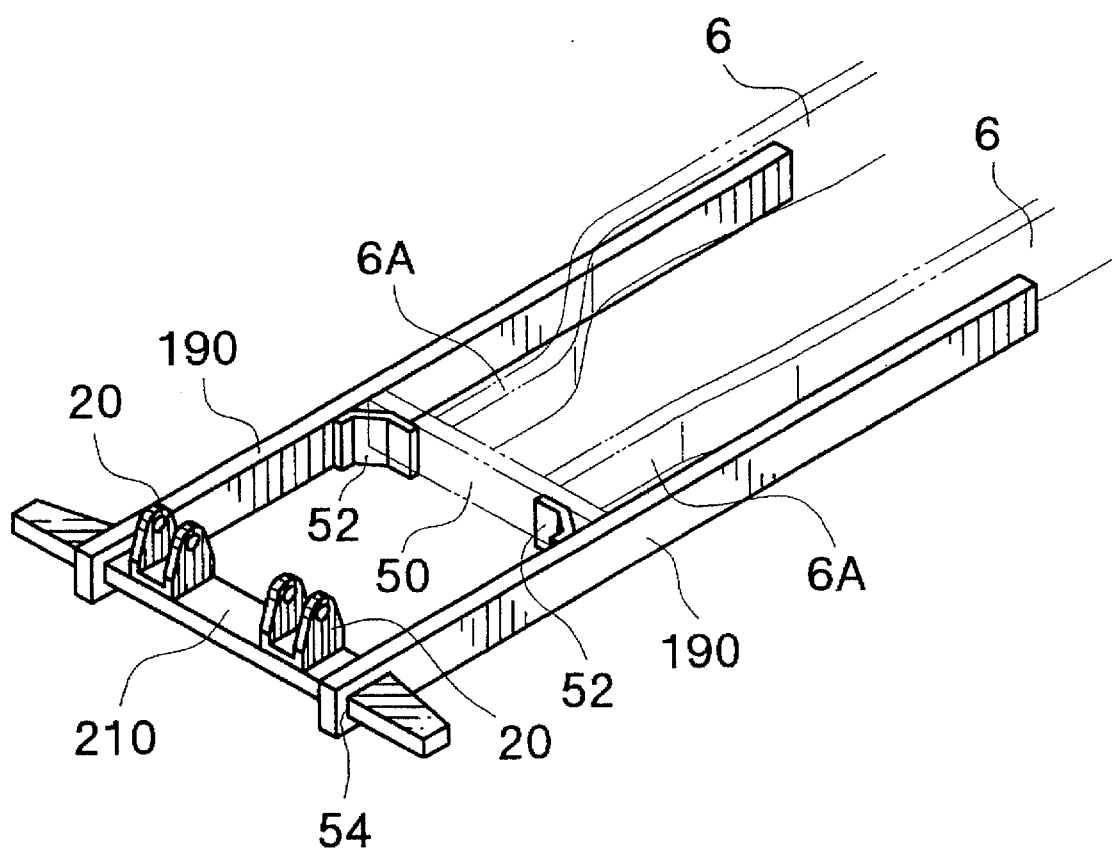
FIG. 12 is a perspective view of a modified frame extension in a third embodiment of the present invention.
Figure 13:
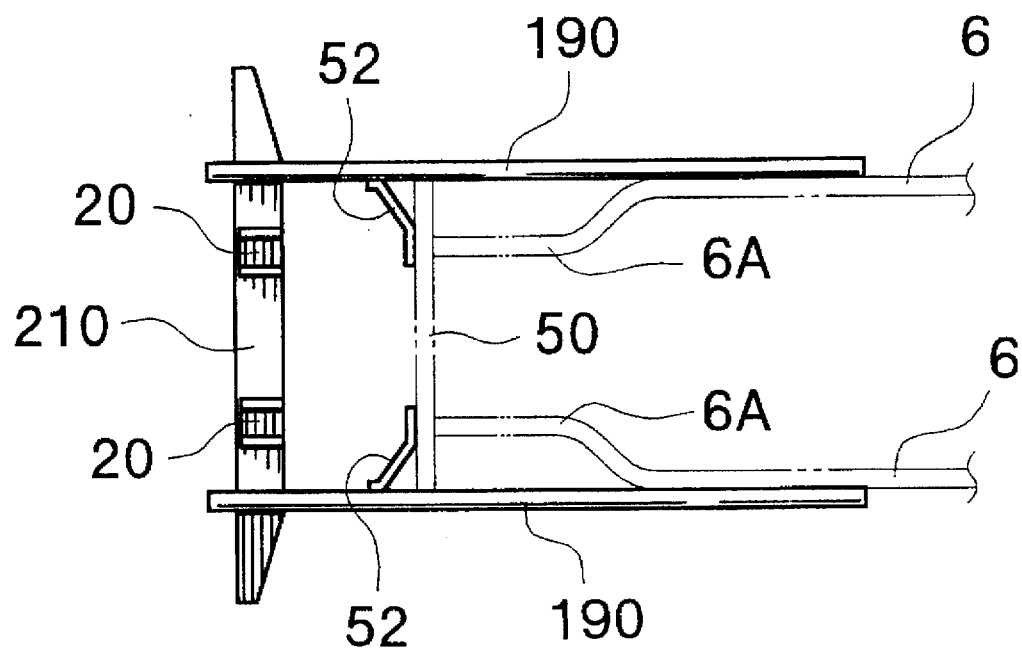
FIG. 13 is a plan view of the frame extension.
Figure 14:
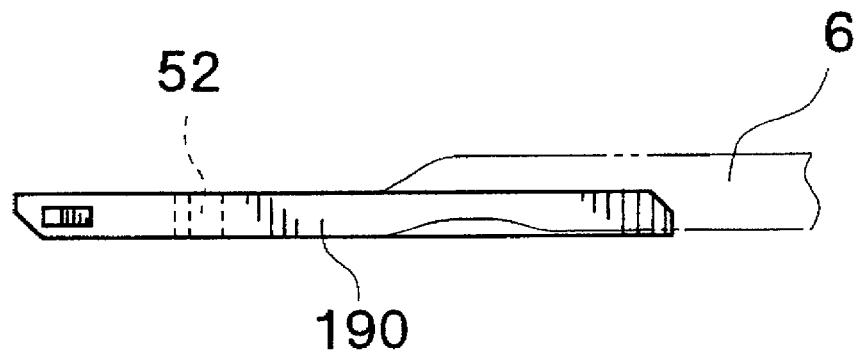
FIG. 14 is a side view of FIG. 13.

Referring to FIGS. 12 to 14, shown therein is the low profile truck (only a part of which is shown) according to a third embodiment of the present invention which is a further modified first embodiment. This embodiment will now be described with reference to FIGS. 12 to 14, wherein only parts different from those in FIGS. 2 and 3 to 9 will be explained.

In this embodiment, frame extensions 190 are connected to the forward end portions of the laterally spaced chassis frames 6 by welding or the like. Each frame extension 190 is made of a tubular member having a rectangular configuration in cross section and is substantially horizontally extended. As clearly shown in the drawings, the chassis frames 6 used herein are modified from those of the first embodiment and include front deflected sections 6A inwardly and downwardly deflected and a cross beam 50 mounted on the end edges of the front deflected sections 6A. As best shown in FIG. 14, each frame extension 190 is arranged along the chassis frame 6 so that the lower surface thereof is coplanar with the lower surface of the front deflected section 6A. Also, each frame extension 190 is connected to the cross beam 50 by a bracket 52. The frame extensions 190 further include a cross member 210 which extends laterally from forward end portions of the frame extensions 190. The cross member 210 is made of a tubular member having a flattened rectangular configuration in cross section and is closely and fixedly inserted at both ends thereof into through holes 54 formed on the frame extensions 190. As best shown in FIG. 12, unlike the first embodiment, the front mounts 20 are directly mounted on the cross member 210.

In this embodiment, the frame extension 190 is arranged in a lower position so that the cab 3 is lowered to an extent substantially equal to that of the first embodiment.

In the embodiments as described above, each rear mount 23 supporting the cab 3 is mounted on the chassis frame 6. However, such a rear mount 23 can be mounted on the frame extension 19. Alternatively, the connecting bar 47 connecting between the lid 42 and the covering component 38 may be a flexible member, such as a cable.

As described above, according to the present invention, the low profile truck can be manufacturing by utilizing the chassis frame and the cab for the cab-over-engine truck without changing the layout of the engine and other elements. Therefore, the low profile truck and the cab-over-engine truck can be optionally and easily manufactured. Moreover, the manufacturing cost of the low profile truck is extremely reduced compared to that of a custom made low profile truck manufactured by utilizing specifically designed components since costs for providing manufacturing equipment are remarkably reduced.

The preferred embodiments herein described are intended to be illustrative of the invention and not to limit the invention to the precise form herein described. They are chosen and described to explain the principles of the invention and their application and practical use to enable others skilled in the art to practice the invention.

What is claimed is:

1. A low profile cab-front-engine truck converted by utilizing a conventional chassis frame and a conventional cab designed for a cab-over-engine truck in which an engine is arranged adjacent to a front axle and in which the cab is arranged over the engine, and by shifting the cab to a front lower position in front of the engine, comprising:
   a conventional chassis frame;
   a chassis frame extension provided on at least one side surface of a forward end portion of the chassis frame and forwardly extended therefrom;
   a front mount provided on said frame extension; and
   a rear mount provided on the chassis frame,
   said cab being supported at the front lower position by said front and rear mounts.

2. The low profile cab-front-engine truck as defined in claim 1, wherein said frame extension includes a front lower surface which is inclined to correspond to an approach angle.

3. The low profile cab-front-engine truck as defined in claim 1 further comprising a front bumper mounted on a forward end portion of said frame extension, said front bumper being made of a tubular member having a circular configuration in cross section.

4. The low profile cab-front-engine truck as defined in claim 3, wherein said front bumper includes a side end section which is rearwardly extended along a side wall of the cab, said side end section being downwardly inclined to correspond to an approach angle.

5. The low profile cab-front-engine truck as defined in claim 1 further comprising a steering shaft linkage mechanism interconnected between a steering shaft provided in the cab and a steering gear box mounted on the chassis frame.

6. The low profile cab-front-engine truck as defined in claim 5, wherein said steering gear box is mounted on the chassis frame such that an input shaft of said steering gear box is forwardly directed.

7. The low profile cab-front-engine truck as defined in claim 1 further comprising an auxiliary luggage box arranged over the front axle and the engine in accordance with the shift of the cab to the front lower position of the truck.

8. The low profile cab-front-engine truck as defined in claim 1 further comprising a utility box provided in a space which is formed under a floor panel of the cab in accordance with the shift of the cab to the front lower position of the truck.

9. A low profile cab-front-engine truck converted by utilizing a conventional chassis frame and a conventional cab designed for a cab-over-engine truck in which an engine is arranged adjacent to a front axle and in which the cab is arranged over the engine, and by shifting the cab to a front lower position in front of the engine, comprising:

a conventional chassis frame;

a frame extension provided on a forward end portion of the chassis frame;

a front mount provided on said frame extension;

a rear mount provided on said chassis frame, said cab being supported at the front lower position by said front and rear mounts, a front bumper mounted on a forward end portion of said frame extension, said front bumper being made of a tubular member having a circular configuration in cross section, and said front bumper including a side end section which is rearwardly extended along a side wall of the cab, said side end section being downwardly inclined to correspond to an approach angle $\alpha$.

10. The low profile cab-front-engine truck as defined in claim 9, wherein the approach angle $\alpha$ is the angle formed between a plane which is tangential to front wheels of the truck and passes through a lower surface of the central bumper section.

11. The low profile cab-front-engine truck as defined in claim 9 further comprising a steering shaft linkage mechanism interconnected between a steering shaft provided in the cab and a steering gear box mounted on the chassis frame.

12. The low profile cab-front-engine truck as defined in claim 11, wherein said steering gear box is mounted on the chassis frame such that an input shaft of said steering gear box is forwardly directed.

13. The low profile cab-front-engine truck as defined in claim 9 wherein a space is formed over the front axle and the engine in accordance with the shift of the cab to the front lower position of the truck and an auxiliary luggage box is provided in said space.

14. The low profile cab-front-engine truck as defined in claim 9 further comprising a utility box provided in a space which is formed under a floor panel of the cab in accordance with the shift of the cab to the front lower position of the truck.

* * * * *